United States Patent [19]
Logrippo

[11] 3,864,081
[45] Feb. 4, 1975

[54] APPARATUS FOR STERILIZING BIOLOGIC MATERIAL AND THE LIKE BY ULTRA-VIOLET IRRADIATION

[75] Inventor: Gerald A. Logrippo, Pleasant Ridge, Mich.

[73] Assignee: Spectroderm International Inc., Fairfax, Va.

[22] Filed: June 12, 1973

[21] Appl. No.: 369,250

[52] U.S. Cl............ 21/102 R, 21/DIG. 2, 21/54 R, 250/435
[51] Int. Cl................................................. A61l 3/00
[58] Field of Search........... 21/DIG. 2, 54 R, 102 R; 250/433, 434, 437, 439, 454, 435; 195/127

[56] References Cited
UNITED STATES PATENTS

| | | | |
|---|---|---|---|
| 1,486,473 | 3/1924 | Ailhaud | 21/DIG. 2 |
| 2,332,099 | 10/1943 | McKinnis | 21/54 R |
| 2,725,482 | 11/1955 | Levinson et al. | 250/433 |
| 2,822,476 | 2/1958 | Osgood | 250/455 |

Primary Examiner—Barry S. Richman
Assistant Examiner—Bradley Garris

[57] ABSTRACT

An apparatus for sterilizing biological materials and the like comprising a casing with a lower plastic tray with a plurality of openings therein for receiving volume bottles of varying quantities and an open chamber above said tray, with said bottles extending therein. The upper portion of the casing, above the chamber is provided with a compartment in the upper portion thereof in which is disposed a Quartz chamber and an ultra-violet lamp. The chamber is provided with a removable tray in the bottom thereof and adjustable means are provided for varying the distance of the ultra-violet lamp from the Quartz chamber. Clamp means are provided for holding the Quartz chamber which clamp means are detachably connected to a Quartz chamber so that the Quartz chamber may be readily removed therefrom. The clamp means are provided with adjustable means so that they may be moved toward and away from each other so as to hold Quartz chambers of different sizes. The compartment is provided with a hinged lid adjacent to the top thereof. Pump means are provided in the casing adjacent the compartment and an affluent manifold and an effluent manifold are provided in the chamber below the compartment and tubing is provided to connect the various liquid containers with the manifolds, the pump means, and the Quartz chamber.

8 Claims, 3 Drawing Figures

APPARATUS FOR STERILIZING BIOLOGIC MATERIAL AND THE LIKE BY ULTRA-VIOLET IRRADIATION

The present invention provides an apparatus for sterilizing biological material, including liquids in connection with the treatment of human plasma, plasma components, human and animal sera, and virus vaccines.

The present apparatus provides a compact and efficient device for utilization in the cold sterilization process of contaminated biological fluids, commonly used in the laboratory, to obtain the same degrees of biological sterilization accomplished with industrial equipment.

Another object of the present invention is to provide an apparatus for the cold sterilization process of contaminated biological fluids in accordance with the process of U.S. Pat. No. 3,076,748, in which the fluid is subjected to the action of ultra-violet irradiation and beta-propiolactone (BPL) by providing adjusting means for varying the intensity of the ultra-violet irradiation and by providing adjusting means for varying the size of the Quartz tube through which the fluid flows.

It is another object of the present invention to provide a compact apparatus for utilization in the sterilization of fluids that are compact in nature and can be readily moved from place to place.

It is still another object of the present invention to provide an apparatus for utilization in the cold sterilization processing of biological materials that has a series of manifolds and a tray means for placing jars or bottles of various sizes therein and tubing for connecting the various bottles to the manifold and pump means embodied in the device so that it enhances the efficiency of the laboratory in which the device is used.

Various other objects and advantages of the present invention will be readily apparent when considered in connection with the accompanying drawings forming a part thereof and in which.

Figure 1:
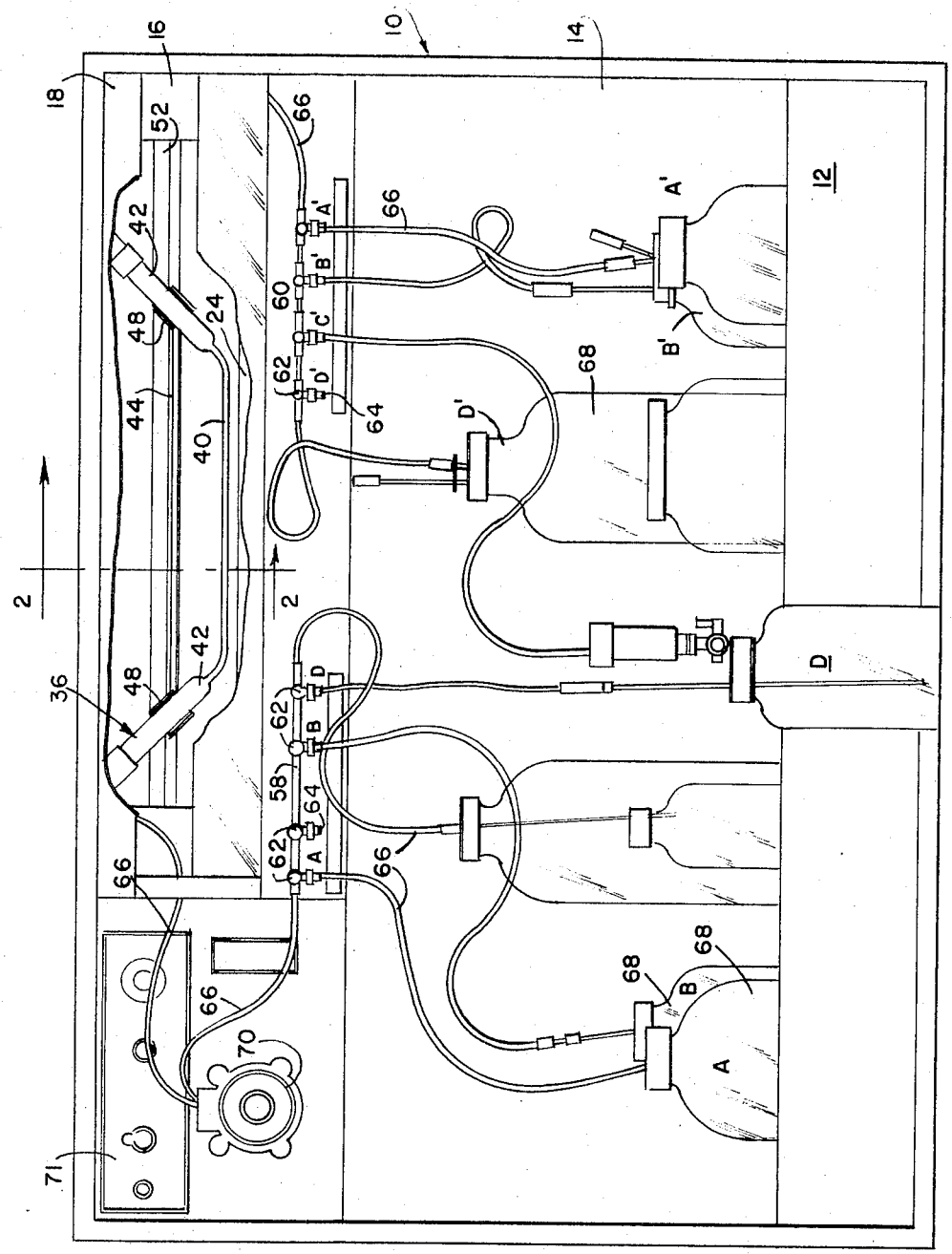
FIG. 1 is a side elevational view of the apparatus embodied in the present invention.

Referring to the drawings the reference numeral 10 generally designates a casing or housing of substantially rectangular configuration in which is disposed a removable plastic tray 12 in the bottom thereof which has a plurality of openings therein to receive bottles or containers, as best seen in FIG. 1. An open chamber indicated as 14 is provided in the casing above the tray 12 so that the various liquid containers or bottles disposed in the tray 12 extend upwardly into the chamber.

Figure 2:
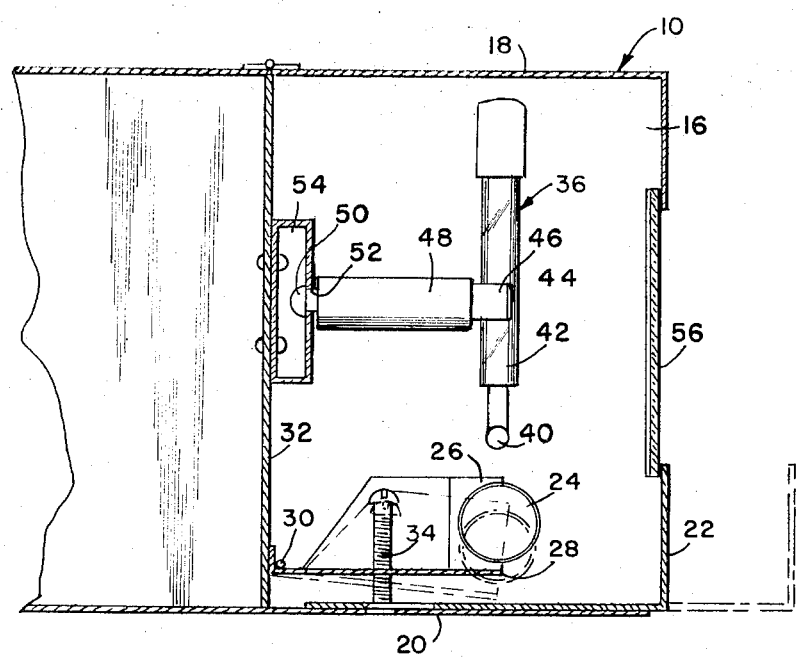
FIG. 2 is an enlarged section taken along the line 2—2 of FIG. 1.
Figure 3:
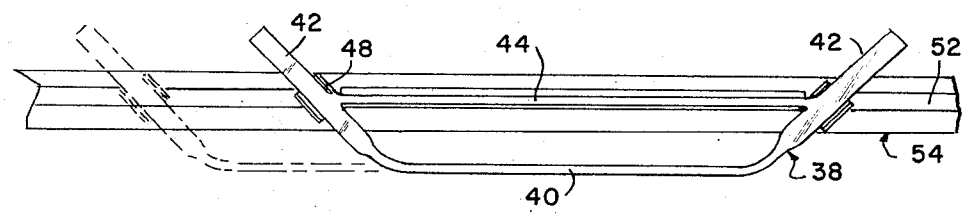
FIG. 3 is a detailed view of the clamping means and adjusting means of the Quartz chamber embodied in the present invention.

Adjacent the top of the casing is a substantially rectangular compartment 16. The compartment 16 is provided with a hinged lid 18 connected to the casing 10, as best seen in FIG. 2. For ready access to the interior of the compartment, the bottom 20 of the compartment has seated thereon a removable tray 22. An ultra-violet tube 24 is disposed in the lower portion of the compartment 16, and has its opposite ends detachably connected or secured to fixtures 26 for supplying a source of electricity thereto. The fixtures 26 are supported by a horizontal member 28 hinged at 30 to the rear wall 32 of the compartment. Two threaded screw members 34 extend through the horizontal member or plate 28 adjacent the opposite ends thereof and can be turned or rotated clockwise so as to cause the plate member 28 to pivot in an upwardly direction, or can be turned counter-clockwise to cause the plate member 28 to move to a downward position, as indicated by dotted lines in FIG. 2, in order to adjust or vary the distance of the ultra-violet tube 24 from a Quartz chamber (liquid sterilizing enclosure) 36 disposed in the compartment to vary the intensity of the ultra-violet rays on the fluid being treated.

The Quartz chamber comprises a somewhat U-shaped pyrex tube 38 having a horizontal flow tube 40 of approximately 0.10–0.20 mm I.D. for serum flow with upwardly inclined enlarged leg tubes of approximately 6 mm I.D. A horizontal solid glass rod 44 extends between the leg tubes 42 to which it is joined for support. The flow tube is disposed or positioned adjacent the ultra-violet tube 24, as best seen in FIG. 2.

The Quartz chamber 36 is supported by snapping the leg tube 42 over bifurcated resilient metal clamps 46. The clamps 46 are secured to horizontally extending cylindrical members 48 which have screw members 50 extending out of their opposite ends.

The screw members 50 extend through and along an elongated slot 52 in a bracket member 54 so that the heads of the screws 50 are fixed within the hollow bracket 54, as best seen in FIG. 2, in order to support the Quartz chamber. The bracket 54 is secured by rivets or other suitable means to the rear wall 32 of the compartment. The provision of the elongated slot 52 in the bracket member 54 permits the cylindrical members 48 with their metal clamps 46 to be moved toward or away from one another so as to hold and accommodate Quartz chambers of various sizes. The provision of the clamp means permits ready replacement of the Quartz chamber with other chambers as well as permitting ready and easy maintenance thereof for cleaning purposes.

The provision of the slide out tray 22 enables the ultra-violet tube 24 to be readily replaced. A glass panel 56 is secured to the casing between the tray 22 and the lid 18.

Below the compartment 16 there is provided an affluent manifold 58 on one side thereof and an effluent manifold 60 on the other side thereof with each of the manifolds being shown as having four valve stations therein, although any reasonable number of stations could be placed therein. The valve stations 62 are also provided with connections 64 for securing plastic tubing 66 from the containers 68 thereto. A fluid pump 70 is provided adjacent the compartment 16 and has well known connections for connecting its inlet to the affluent manifold and for connecting its outlet to the tubing 66 connected to the inlet end of the Quartz chamber 36. Above the pump and behind panel 71 are located the electrical connections for the equipment and the switches for the pump, the ultra-violet lamp, and for the clockwise and counter-clockwise operation of the pump for normal operation and back-flushing, all of which electrical wiring and controls are well known and do not form the invention.

For purposes of illustration in connection with the apparatus, the container designated A could be biologic material being sterilized. The pump 70 would be actuated and the material would flow through the tubing 66 to the manifold 58 and then into the inlet of the pump 70. Thereafter it would leave the pump 70 and flow through the tubing 66 to the inlet leg tube 42 of the Quartz chamber and then through the flow tube 40 adjacent the ultra-violet tube 24, the fluid then passing out of the discharge leg 42 and through the tubing to the effluent manifold 60 and into the container designated A1. The container or bottle marked B could be an accessory biologic when needed and it too would have the same flow path as already described in connection with the biologic being sterilized in container A, with the accessory biologic when needed being discharged into the container designated B1. The container indicated as D, if desired, could be a sterile saline fluid for washing the system free of betapropiolactone (BPL) and the flow path would be the same as that already described in connection with the previous operation except that the manifold 60 would be connected to a container designated as D1 for receiving the saline waste. It is apparent that the manifolds could be connected to any designated or desired containers and connected to any valves on the manifold.

From the foregoing description it is apparent that the present invention provides a novel apparatus for use in a cold sterilization process in which the Quartz chamber can be quickly assembled and disassembled from its clamping mechanism and in which the clamping mechanism can be adjusted so as to secure Quartz chambers of different sizes.

From the foregoing description it is also apparent that the present invention provides a novel apparatus in connection with the cold sterilization process of biological materials in which adjustable means are provided for varying the distance of the ultra-violet tube utilized in the process from the fluid being passed through the Quartz chamber.

From the foregoing description it is also apparent that the present invention also provides a compact, packaged apparatus for use in a sterilization process that is of a portable nature and can be quickly set up for utilization and moved from place to place as desired and which has easy access to the compartment containing the Quartz chamber and the ultra-violet tube so that they can be quickly assembled and disassembled and so that easy maintenance can be accomplished.

From the foregoing description it is apparent that various other objects and advantages of the present invention are obtained, and in as much as various changes may be made in the location of the several parts, without departing from the scope of the invention, it is not meant to limit the invention except by the scope of the following claims.

what is claimed is:

1. Apparatus for sterilizing liquids comprising a casing defining a chamber therein for receiving liquid container means for liquid to be sterilized, means forming a separate compartment within said casing with a liquid sterilizing enclosure therein, the walls of said enclosure being constructed of Quartz, and ultra-violet tube means within said compartment disposed adjacent said enclosure slidably adjustable clamping means within said comparment for detachably securing said enclosure thereto, means in said compartment for securing said ultra-violet tube thereto including adjustable means for varying the distance of said ultra-violet tube from said enclosure to vary the intensity of irradiation with respect to liquid passed therethrough, pump means in said casing, and means operatively connecting container means disposed in said chamber with said pump means and said enclosure for passing liquid to be sterilized therethrough.

2. The apparatus of claim 1 wherein said enclosure comprises a substantially U-shaped member with a small diameter horizontal fluid tube and larger diameter leg tubes with a glass rod extending between said leg tubes.

3. The apparatus of claim 1 wherein said compartment has a slide out tray in the bottom thereof and a hinged lid forming its top.

4. The apparatus of claim 1 wherein said securing means includes a hinged horizontal member with light socket fixtures adjacent each end for receiving the prongs of said ultra-violet tube and threaded means extending through holes in said horizontal member and bearing against the bottom of said compartment for tilting said horizontal member toward and away from said enclosure.

5. The apparatus of claim 1 wherein said slidable adjustable clamping means includes clamps on one end of a horizontal member and locking means on the other end of said horizontal member, a hollow bracket member with a horizontal elongated slot therein and said locking means is slidably disposed in said slot.

6. The apparatus of claim 5 wherein said locking means is a headed screw member.

7. The apparatus of claim 1 wherein the casing has a tray in its bottom with openings therein for receiving liquid container means.

8. The apparatus of claim 7 wherein an affluent manifold means and an effluent manifold means are provided in said casing each with a plurality of valve stations and tube fitting connections thereon for fitting plastic tubing thereto for carrying liquid from a container means to said pump means through said enclosure and back to another container means.

* * * * *